United States Patent
Yoo

(10) Patent No.: US 9,331,595 B2
(45) Date of Patent: May 3, 2016

(54) MULTI-LEVEL INVERTER

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 174 days.

(21) Appl. No.: 14/302,121

(22) Filed: Jun. 11, 2014

(65) Prior Publication Data

US 2014/0369088 A1    Dec. 18, 2014

(30) Foreign Application Priority Data

Jun. 17, 2013    (KR) .......................... 10-2013-0068856

(51) Int. Cl.
*H02P 6/14*    (2006.01)
*H02M 5/458*    (2006.01)
*H02M 7/487*    (2007.01)
(Continued)

(52) U.S. Cl.
CPC .............. *H02M 5/458* (2013.01); *H02M 7/483* (2013.01); *H02M 7/487* (2013.01); *H02M 7/49* (2013.01)

(58) Field of Classification Search
USPC ......... 318/400.26, 400.27, 400.29, 254.2, 75, 318/400.3; 363/17, 62, 64–72, 37, 45, 131, 363/132, 16, 123, 134, 135; 307/52, 72, 77
See application file for complete search history.

(56) References Cited

U.S. PATENT DOCUMENTS

| | | | |
|---|---|---|---|
| 5,625,545 | A | 4/1997 | Hammond |
| 5,886,888 | A | 3/1999 | Akamatsu et al. |
| 2003/0043603 | A1* | 3/2003 | Schreiber .............. H02M 5/458 363/37 |

(Continued)

FOREIGN PATENT DOCUMENTS

| | | |
|---|---|---|
| JP | 08-308231 | 11/1996 |
| JP | 2000-228883 | 8/2000 |

(Continued)

OTHER PUBLICATIONS

Kai, et al., "Research on a Novel Three-Phase Hybrid Asymmetric 9-Level Inverter," The 30th Annual Conference of the IEEE Industrial Electronics Society, XP010799747, Nov. 2004, pp. 856-861.

(Continued)

*Primary Examiner* — Shawki S Ismail
*Assistant Examiner* — Jorge L Carrasquillo
(74) *Attorney, Agent, or Firm* — Lee, Hong, Degerman, Kang & Waimey PC; Jonathan Kang; Justin Lee

(57) ABSTRACT

A multi-level inverter includes: a rectifying unit to rectify received a three-phase voltage; a smoothing unit to receive the rectified voltage and provide the rectified voltage as voltages having different levels to first to third different nodes; and an inverter unit including a plurality of switch units to transfer the voltages having three levels provided from the smoothing unit, wherein the inverter unit includes a first switch unit provided between the first node and a first output terminal, a second switch unit provided between the second node and the first output terminal, a third switch unit provided between the third node and the first output terminal, a fourth switch unit provided between the first node and a second output terminal, a fifth switch unit provided between the second node and the second output terminal, and a sixth switch unit provided between the third node and the second output terminal.

8 Claims, 19 Drawing Sheets

(51) Int. Cl.
*H02M 7/49* (2007.01)
*H02M 7/483* (2007.01)

(56) References Cited

U.S. PATENT DOCUMENTS

| | | | |
|---|---|---|---|
| 2011/0242866 A1 | 10/2011 | Takizawa | |
| 2012/0155135 A1 | 6/2012 | Fujii | |
| 2013/0076280 A1* | 3/2013 | Yoo | H02M 5/42 318/400.3 |
| 2013/0264876 A1* | 10/2013 | Paakkinen | H02M 7/53871 307/52 |
| 2013/0301314 A1* | 11/2013 | Fu | H02M 7/487 363/37 |

FOREIGN PATENT DOCUMENTS

| | | |
|---|---|---|
| JP | 2004-222421 | 8/2004 |
| JP | 2010-288415 | 12/2010 |
| JP | 2011-223664 | 11/2011 |
| JP | 2012-110095 | 6/2012 |
| JP | 2012-130224 | 7/2012 |
| JP | 2013-074789 | 4/2013 |
| WO | 2011/064277 | 6/2011 |

OTHER PUBLICATIONS

Schweizer, et al., "Comparison of the Chip Area Usage of 2-Level and 3-Level Voltage Source Converter Topologies," IECON 2010, 36th Annual Conference on IEEE Industrial Electronics Society, IEEE, XP031840109, Nov. 2010, pp. 391-396.

Carpaneto, et al., "A New Cascaded Multilevel Converter Based on NPC Cells," Industrial Electronics ISIE 2007, IEEE International Symposium on IEEE, PI, XP031156276, pp. 1033-1038.

European Patent Office Application Serial No. 14172147.2 Search Report dated Jun. 18, 2015, 8 pages.

Japan Patent Office Application Serial No. 2014-124525, Office Action dated May 29, 2015, 3 pages.

* cited by examiner

MULTI-LEVEL INVERTER

CROSS-REFERENCE TO RELATED APPLICATION

Pursuant to 35 U.S.C. §119(a), this application claims the benefit of earlier filing date and right of priority to Korean Application No. 10-2013-0068856, filed on Jun. 17, 2013, the contents of which is incorporated by reference herein in its entirety.

BACKGROUND OF THE INVENTION

1. Field of the Invention

The present disclosure relates to an inverter, and particularly, to a multi-level medium-voltage inverter using a unit power cell.

2. Background of the Invention

A multi-level medium-voltage inverter is an inverter in which an effective value of an input line-to-line voltage has input power of 600V or higher, and an output phase voltage thereof has multiple stages (or multiple levels). A medium-voltage inverter is generally used to drive a motor having large capacity ranging from hundreds of kW to tens of MW, and mainly used in the fields such as fans, pumps, compressors, traction, hoist, conveyor, and the like.

A general voltage-type medium-voltage inverter uses a cascaded H-bridge inverter or a cascaded neutral point clamped (NPC) inverter as a modified inverter of the cascaded H-bridge inverter. The cascaded NPC inverters have emerged with its small volume, relative to existing cascaded H-bridge inverters.

Multi-level medium-voltage inverters applied to various fields are required to include smaller elements and have higher efficiency.

SUMMARY OF THE INVENTION

Therefore, an aspect of the detailed description is to provide a multi-level medium-voltage inverter having an effective structure.

To achieve these and other advantages and in accordance with the purpose of this specification, as embodied and broadly described herein, a multi-level medium-voltage inverter may include: a rectifying unit configured to receive a phase voltage from a 3-phase power source and provide a rectified voltage; a smoothing unit configured to receive the rectified voltage and provide the received rectified voltage as voltages having different levels to first to third nodes; and an inverter unit including a plurality of switch units to transmit the voltages having three levels provided from the smoothing unit to a load, wherein the inverter unit includes a first switch unit provided between the first node and a first output terminal, second switch units provided between the second node and the first output terminal, a third switch unit provided between the third node and the first output terminal, a fourth switch unit provided between the first node and a second output terminal, fifth switch units provided between the second node and the second output terminal, and a sixth switch unit provided between the third node and the second output terminal.

The first to sixth switch units may include a power semiconductor and a diode.

The second switch units may include: a first diode having directivity of a current from the second node to the first output terminal; a first power semiconductor having a current flow in the opposite direction of the first diode and connecting one side and the other side of the first diode; a second diode having a current flow in the opposite direction of the first diode and connected to the first diode in series; and a second power semiconductor having a current flow in the opposite direction of the first power semiconductor and connecting one side and the other side of the second diode.

The first switch unit may include: a first diode having directivity of a current from the first output terminal to the first node; and a first power semiconductor having a current flow in the opposite direction of the first diode and connecting one side and the other side of the first diode.

The third switch unit may include: a second diode having directivity of a current from the third node to the first output terminal; and a second power semiconductor having a current flow in the opposite direction of the second diode and connecting one side and the other side of the second diode.

The fifth switch unit may include: a first diode having directivity of a current from the second node to the second output terminal; a first power semiconductor having a current flow in the opposite direction of the first diode and connecting one side and the other side of the first diode; a second diode having a current flow in the opposite direction of the first diode and connected to the first diode in series; and a second power semiconductor having a current flow in the opposite direction of the first power semiconductor and connecting one side and the other side of the second diode.

The fourth switch unit may include: a first diode having directivity of a current from the second output terminal to the first node; and a first power semiconductor having a current flow in the opposite direction of the first diode and connecting one side and the other side of the first diode.

The sixth switch unit may include: a second diode having directivity of a current from the third node to the second output terminal; and a second power semiconductor having a current flow in the opposite direction of the second diode and connecting one side and the other side of the second diode.

The smoothing unit may include: first and second capacitors connected in series, wherein the first and second capacitors receive the rectified voltage through one side and the other side thereof, and one side, a common node, and the other side of the first and second capacitors are the first to third nodes.

The rectifying unit may include: first and second diodes connecting one side and the other side of each of the first and second capacitors and receiving a first phase voltage by the common node; third and fourth diodes connecting one side and the other side of each the first and second capacitors and receiving a second phase voltage by the common node; and fifth and sixth diodes connecting one side and the other side of each of the first and second capacitors and receiving a third phase voltage by the common node.

The multi-level inverter may include a plurality of unit power cells each including the rectifying unit, the smoothing unit, and the inverter unit, and further include a phase shift transformer receiving a phase voltage and providing a power signal having a predetermined phase to the unit power cells.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
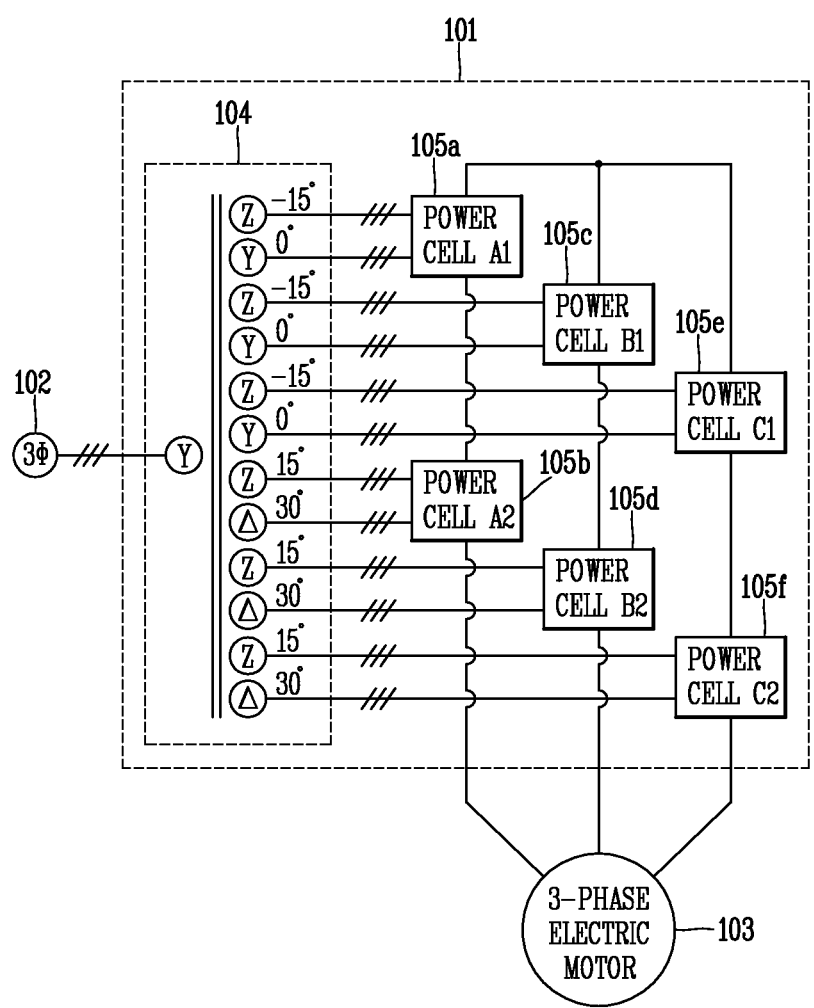
FIG. 1 is a block diagram illustrating a power conversion circuit including an inverter according to an exemplary embodiment of the present disclosure.

FIG. 1 is a block diagram illustrating a power conversion circuit including an inverter according to an exemplary embodiment of the present disclosure.

Referring to FIG. 1, an inverter system including a phase shift transformer and a multi-level medium-voltage inverter includes an input three-phase power source 102, a three-phase motor 103, a phase shift transformer 104, and unit power cells 105a to 105f.

The input three-phase power source 102 supplies a line-to-line voltage root mean square equal to or higher than 600V. The three-phase motor 103 is a load of the inverter system. A primary winding of the phase shift transformer 104 has a three-phase Y connection form, and a total of twelve secondary windings including three windings having a phase difference of −15 degrees, three windings having a phase difference of 0 degree, three windings having a phase difference of 15 degrees, and three windings having a phase difference of 30 degrees with respect to the primary winding. The structure of the secondary windings may be determined according to the number of unit power cells 105a to 105f.

A magnitude of an output voltage of each of the unit power cells 105a to 105f has five levels. Two unit power cells are provided per phase of the motor 103 operated as a load, and the number of unit power cells may be increased as needed. The unit power cells 105a and 150b are connected in series to output an a-phase voltage to the three-phase motor as a load, the unit power cells 105c and 105d output a b-phase voltage, and the unit power cells 105e and 105f output a c-phase voltage. The unit power cells 105a, 105c, and 105e receive outputs having phases of −15 degrees and 0 degree among outputs of the phase shift transformer 104, and the unit power cells 105b, 105d, and 105f receive outputs having phases of 15 degrees and 30 degrees among the outputs of the phase shift transformer 104.

Figure 2:
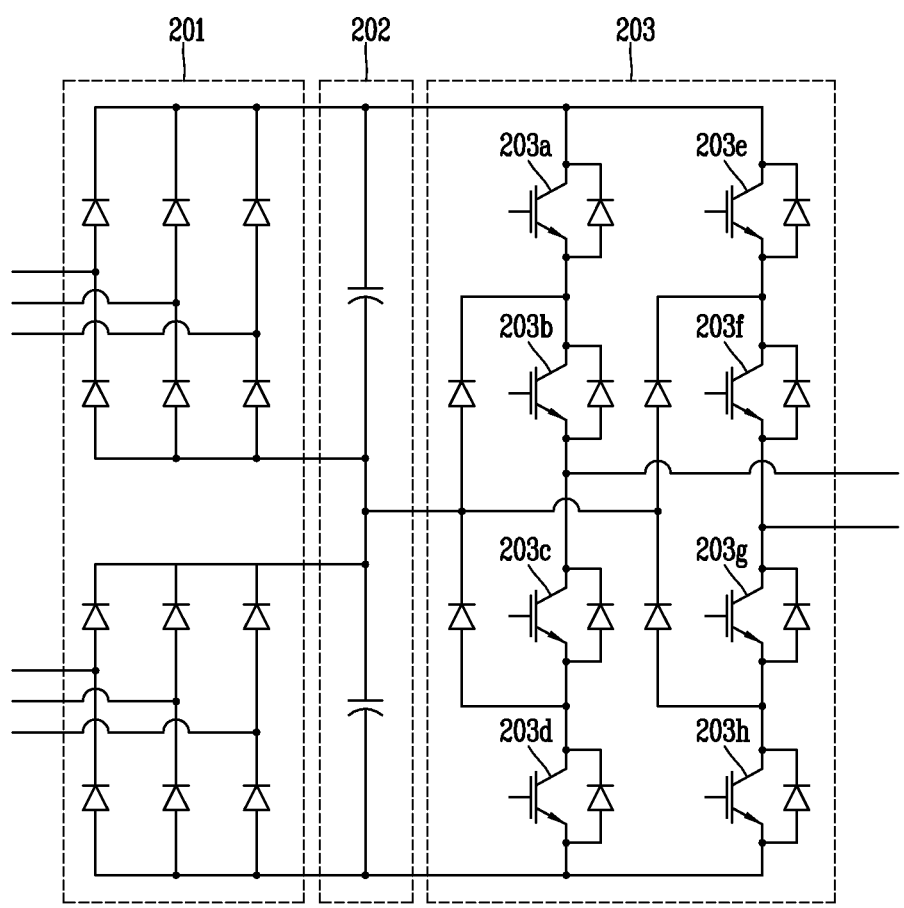
FIG. 2 is a block diagram illustrating a structure of each unit power cell illustrated in FIG. 1.

FIG. 2 is a block diagram illustrating a structure of each of the unit power cells illustrated in FIG. 1.

Referring to FIG. 2, a unit power cell includes a diode rectifying unit 201, a smoothing unit 202, and an inverter unit 203 synthesizing output voltages. The diode rectifying unit 201 receives two three-phase powers, and the input powers are output from the phase shift transformer 104 illustrated in FIG. 1. An output from the diode rectifying unit 201 is delivered to two DC-link capacitors connected in series, and the two DC-link capacitors have the same capacitance. The inverter unit 203 serves to synthesize an output from the diode rectifying unit 201, and an output line-to-line voltage has 5 levels.

Figure 3:
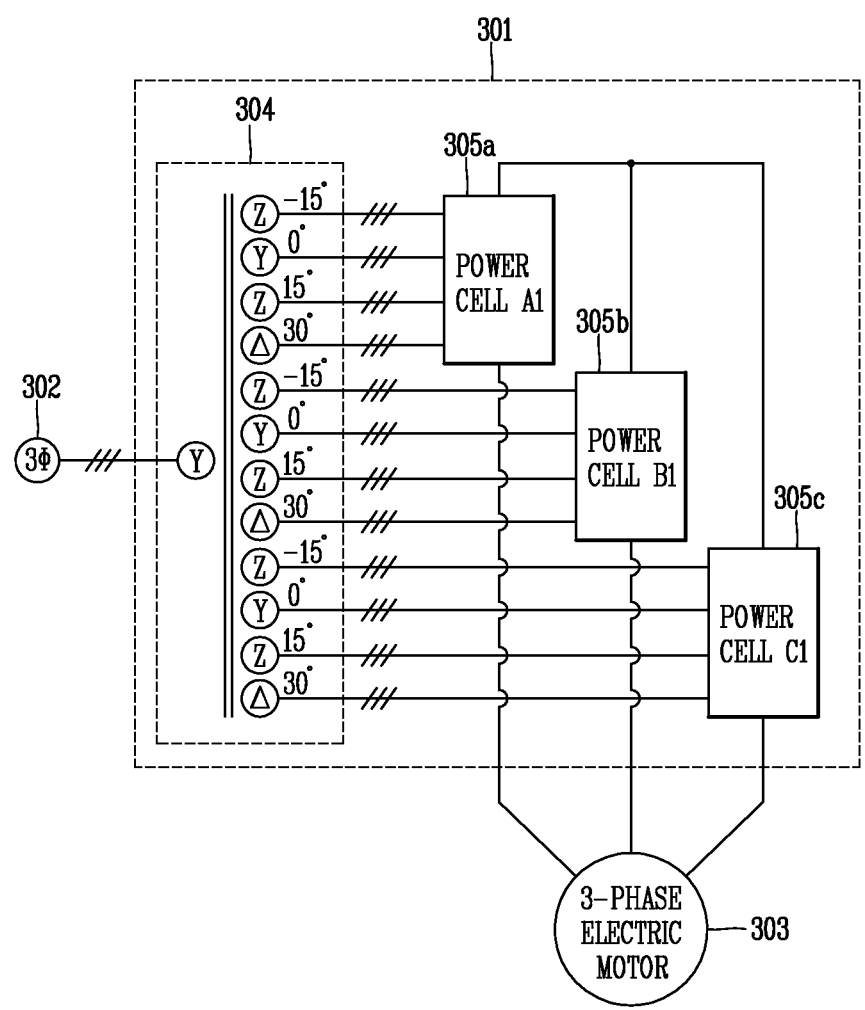
FIG. 3 is a block diagram illustrating a power conversion circuit including another inverter.

FIG. 3 is a block diagram illustrating a power conversion circuit including another inverter.

Referring to FIG. 3, the inverter system includes an input three-phase power source 302, a three-phase motor 303, a phase shift transformer 304, and unit power cells 305a to 305c.

The input three-phase power source 302 supplies a line-to-line voltage root mean square equal to or higher than 600V. The three-phase motor 303 is a load of the inverter system. A primary winding of the phase shift transformer 304 has a three-phase Y connection form, and a total of twelve secondary windings including three windings having a phase difference of −15 degrees, three windings having a phase difference of 0 degree, three windings having a phase difference of 15 degrees, and three windings having a phase difference of 30 degrees with respect to the primary winding. The structure of the secondary windings may be determined according to the number of unit power cells 305a to 305c. The unit power cells 305a to 305c may synthesize 5-level output voltages. The unit power cell 305a outputs an a-phase voltage to the load motor 303, the unit power cell 305b outputs a b-phase voltage, and the unit power cell 305c outputs a c-phase voltage.

Figure 4:
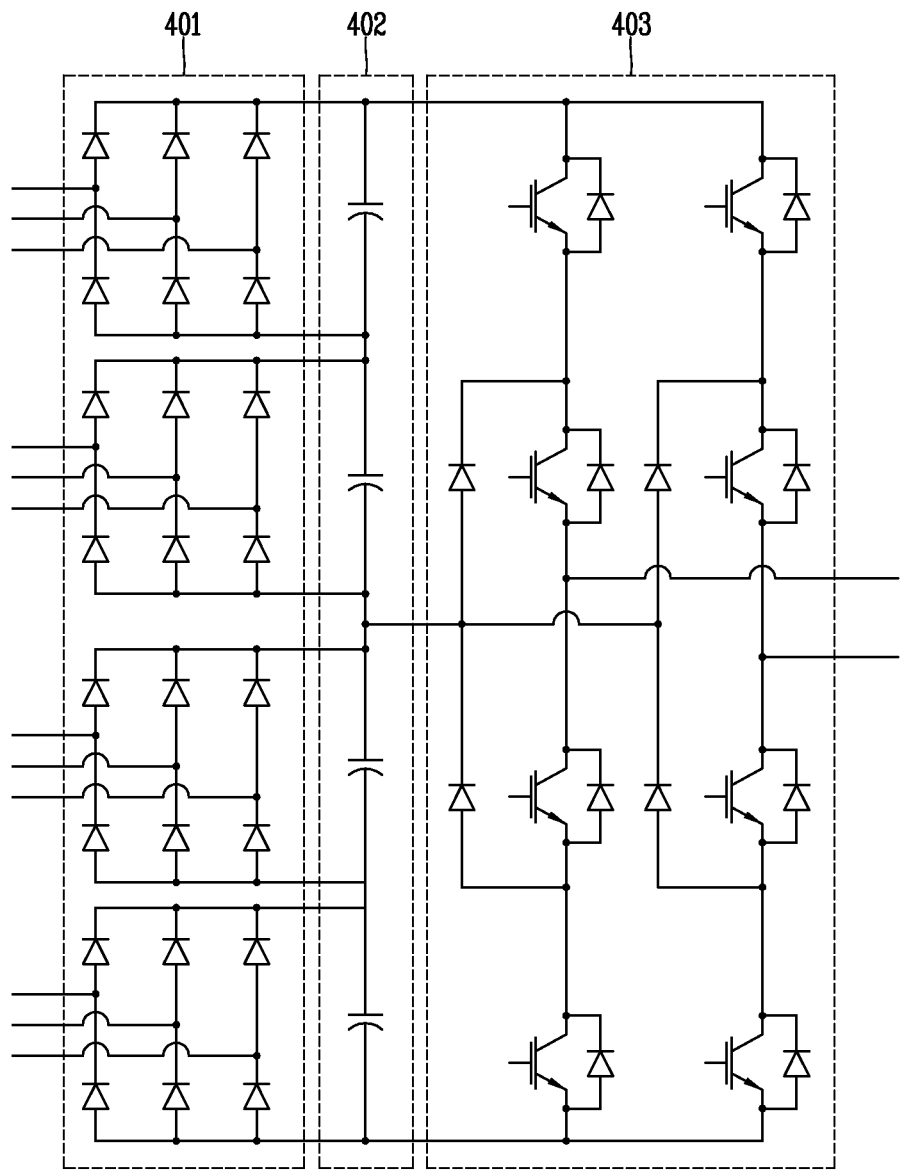
FIG. 4 is a block diagram illustrating a structure of each unit power cell illustrated in FIG. 2.

FIG. 4 is an internal circuit diagram of each of the unit power cell illustrated in FIG. 3. A unit power cell includes a diode rectifying unit 401, a smoothing unit 402, and an inverter unit 403 synthesizing an output voltage. In the unit power cell of FIG. 4, four input terminal diode rectifying units 401 are configured, and an operation of the inverter unit 403 is substantially the same at that of FIG. 2. However, in case of the unit power cells of FIGS. 2 and 4, values of a rated voltage and a rated current of a power element used in the unit power cells may vary according to a requested output. An output voltage of the unit power cell may have 5 levels.

FIGS. 5 through 10 are circuit diagrams illustrating operations of inverter units illustrated in FIGS. 1 and 2. An operation of the inverter unit will be described with reference to FIGS. 1 through 10. In particular, an operation of the inverter unit illustrated in FIGS. 1 and 2 will be mainly described.

Four switch units 203a, 203b, 203c and 204d are connected in series to a leg of the inverter unit 203 illustrated in FIG. 2, and an output voltage is defined according to operations of the switch units.

Operations of the switch units 203a and 203c are complementary, and switching operations of the switch units 203b and 203d are also complementary. Thus, in a case in which a capacitor voltage of the smoothing unit 202 connected in series is defined as E (volt), respectively, when the switch units 203a and 203b are turned on, the switch units 203c and 204d are turned off, at this time a pole voltage E is output. Also, when the switch units 203a and 203c are turned on, the switch units 203b and 203d are turned off, and at this time, an output pole voltage is 0. Similarly, in a state in which the switch units 203a and 203b are turned off, the switch units 203c and 203d are turned on, and in this case, a pole voltage −E is output.

Using output pole voltages defined in this manner, an output line-to-line voltage may have five stages (or levels) of 2E, E, 0, −E, and −2E. Since an output line-to-line voltage of each cell is defined as having 5 levels, a voltage that may be synthesized by the unit power cells 305a, 305b, and 305c of FIG. 3 may have nine levels of 4E, 3E, 2E, E, 0, −E, −2E, −3E, and −4E, and a line-to-line voltage output to the load motor 303 may have 17 levels of 8E, 7E, 6E, 5E, 4E, 3E, 2E, E, 0, −E, −2E, −3E, −4E, −5E, −6E, −7E, and −8E.

A pulse width modulation (PWM) method of a multi-stage medium-voltage inverter may be divided into phase-shifted PWM and level-shifted PWM depending on a form of a triangular carrier. The multi-level inverter using the single-phase NPC inverter described in the present disclosure mainly operates according to the level-shifted PWM method. The level-shifted PWM may be divided into in-phase disposition (IPD), alternative phase opposite disposition (APOD), and phase opposite disposition (POD) depending on a phase of a triangular carrier, and in general, the IPD scheme is excellent in terms of harmonics of an output voltage. Thus, in an embodiment of the present disclosure, a voltage synthesizing method of a multi-level medium-voltage inverter mainly using the level-shifted PWM method based on the IPD scheme will be described in detail.

FIGS. 5 through 10 illustrate conduction states of power semiconductors based on current directions to output pole voltages E, 0, and −E, respectively.

Figure 5:
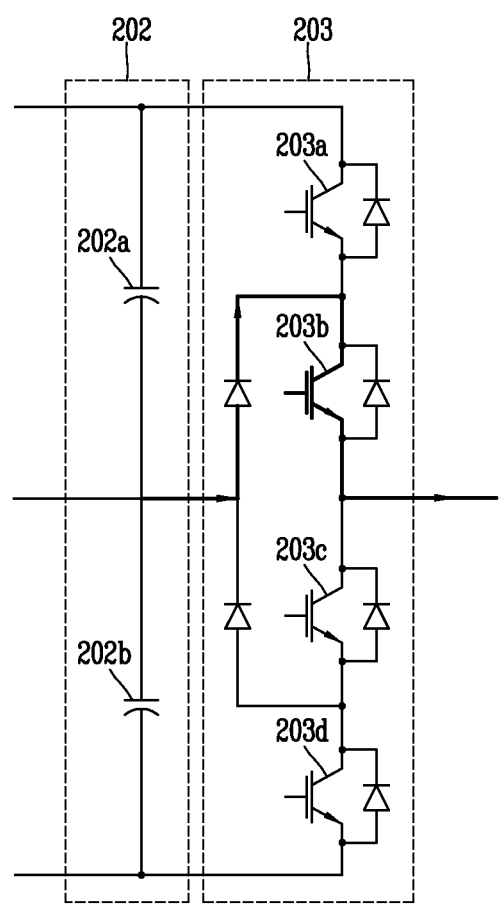
FIGS. 5 through 10 are circuit diagrams illustrating operations of inverter units illustrated in FIGS. 1 and 2.
Figure 6:
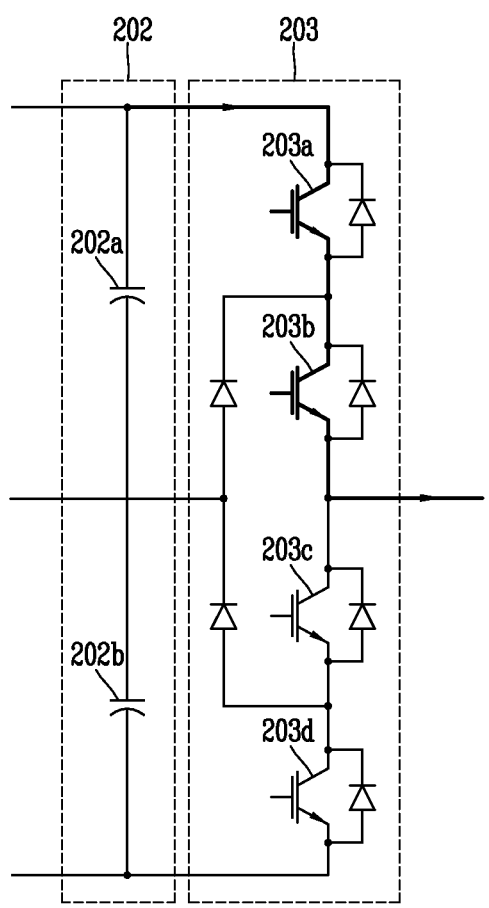
Figure 7:
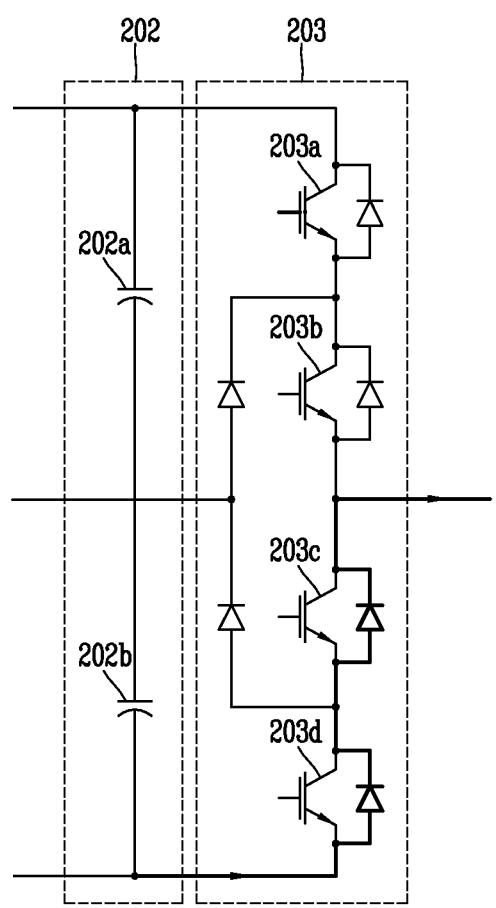

In FIG. 5, a diode and a switch unit 203b are conducted, an output current flows in a positive direction, and a pole voltage 0 is output. Here, one diode and one switch unit are conducted. In FIG. 6, switch units 203a and 203b are conducted, an output current flows in a positive direction, and a pole voltage E is output. Here, two switch units are conducted. In FIG. 7, two diodes are conducted, an output current flows in a positive direction, and a pole voltage −E is output. Here, two diodes are conducted.

Figure 8:
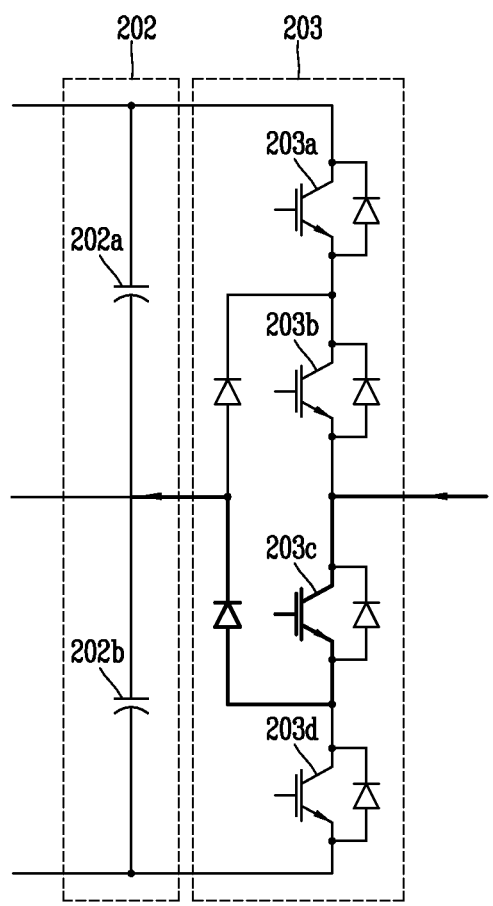
Figure 9:
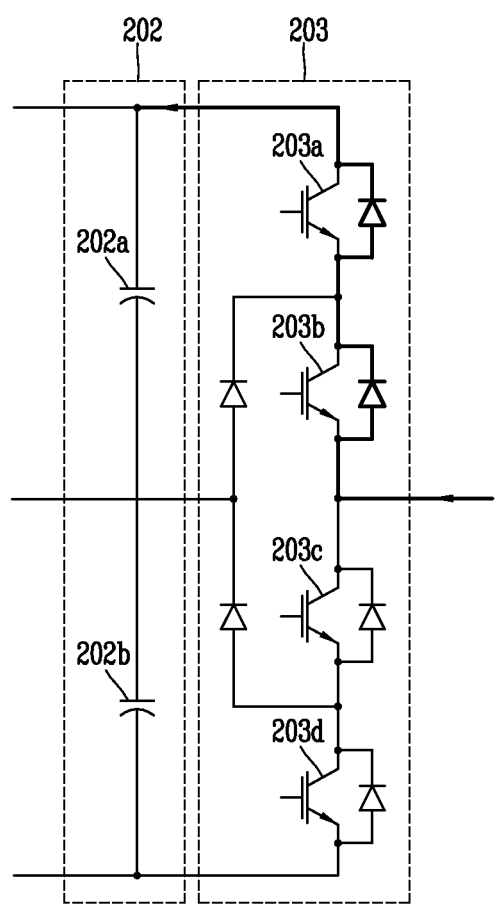
Figure 10:
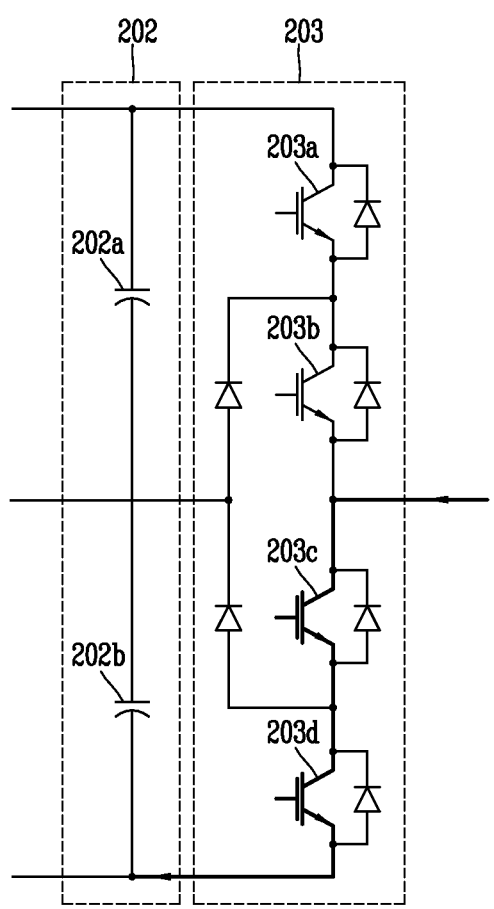

In FIG. 8, a diode and a switch unit 203c are conducted, an output current flows in a negative direction, and a pole voltage 0 is output. In FIG. 9, two diodes are conducted, an output current flows in a negative direction, and a pole voltage E is output. In FIG. 10, two switch units 203c and 203d are conducted, an output current flows in a negative direction, and a pole voltage −E is output Hereinafter, operations of the diode rectifying units 201 and 401 of FIGS. 2 and 4 will be described. The rectifying unit 201 of FIG. 2 and the rectifying unit 401 of FIG. 4 are connected to the secondary sides of the phase shift transformer 104 of FIG. 3 and the phase shift transformer 304 of FIG. 3 and apply a rectified voltage to capacitors of the smoothing units 202 and 402, respectively. In the systems configured as illustrated in FIGS. 1 and 3, output terminals of the rectifying units 201 and 401 are directly connected to the capacitors respectively provided in the smoothing unit 202 of FIG. 2 and the smoothing unit 402 of FIG. 4, and thus, voltages of the respective capacitors have a value expressed by equation 1 on average in a no-load state.

$$(V_{dc\_cap}) = \frac{3\sqrt{6}\,V}{\pi} \quad \text{[Equation 1]}$$

Here, V is a magnitude of a phase voltage input to the rectifying units 201 and 401. Two DC link source voltages having the relationship as expressed by Equation 1 are illustrated in FIG. 2 and four DC link source voltages having the relationship as expressed by Equation 1 are illustrated in FIG. 4, and the number of outputs of the phase shift transformers 104 and 404 is determined depending on the number of rectifying units.

It can be seen that, in the cascaded NPC inverter described above with reference to FIGS. 1 through 10, two power semiconductors are conducted all the time. The cascaded NPC inverter described above with reference to FIGS. 1 through 10 is advantageous in that it is small in volume, compared to the cascaded H-bridge inverter, but since two power semiconductors need to be conductive constantly, it is difficult to increase efficiency and a heat dissipation device needs to be relatively large.

In order to address the aforementioned problem, the present disclosure proposes a multi-level medium-voltage inverter in which an input unit of a unit power cell is configured as a 6-pulse diode rectifying unit and an inverter unit of the unit power cell is configured to reduce heat loss according to conduction, compared to the existing 3-level NPC inverter, to thus increase efficiency of the unit power cell.

In an existing high-voltage inverter, an inverter unit of a unit power cell is configured as an H-bridge inverter or a single phase NPC inverter to connect unit power cells in series. In contrast, the unit power cell of the multi-level medium-voltage inverter proposed in the present disclosure is implemented as a single phase T-type NPC inverter. The unit power cell configured as the single phase T-type NPC inverter has less conduction loss related to heat, compared to the existing unit power cell, and thus, a design for heat dissipation may be advantageous. In addition, the number of power semiconductor elements (switches) used for operation is smaller than that of the unit power cell using the single phase NPC inverter.

In addition, an input terminal of the unit power cell using the T-type NPC inverter used in the present disclosure may be configured as a 6-pulse, 12-pulse, or 24-pulse diode rectifying unit. The use of the 6-pulse diode rectifying unit may simplify the structure of a phase shift transformer of an input terminal, compared to the use of the 12-pulse or 24-pulse diode rectifying unit.

Figure 11:
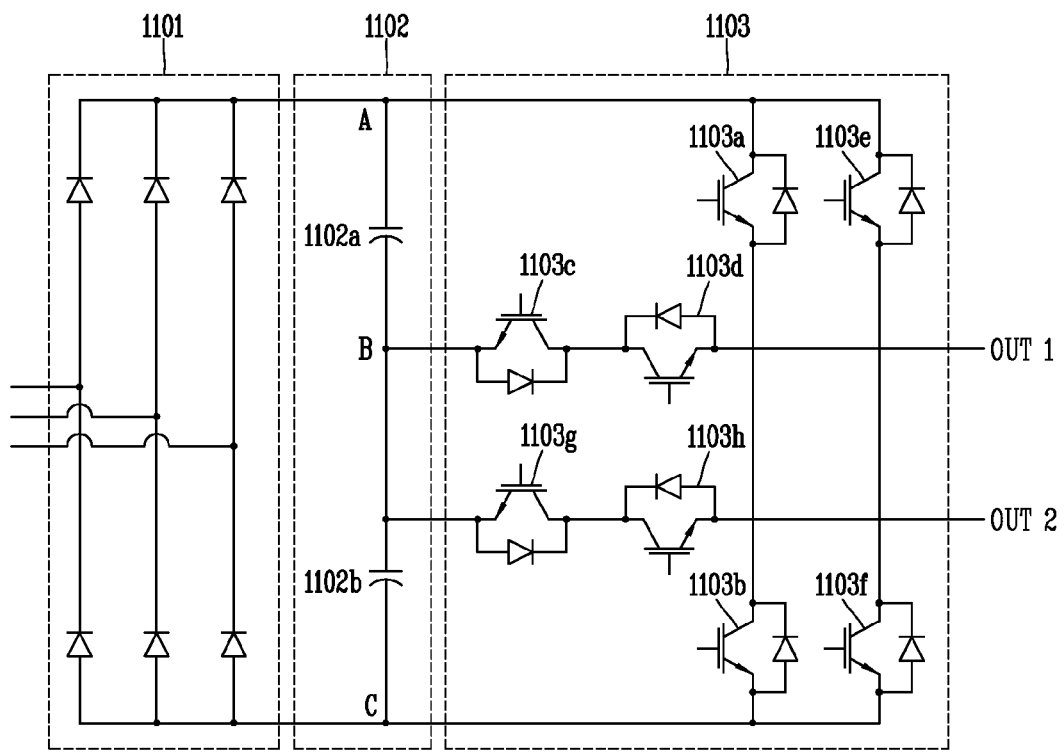
FIG. 11 is a circuit diagram illustrating unit power cells according to a first exemplary embodiment of the present disclosure.

FIG. 11 is a circuit diagram illustrating a unit power cell according to a first exemplary embodiment of the present disclosure.

As illustrated in FIG. 11, the unit power cell includes a rectifying unit 1101, a smoothing unit 1102, and an inverter unit 1103. The rectifying unit 1101, serving to rectify a provided AC voltage, receives a three-phase input voltage by using six diodes and provides a rectified voltage to the smoothing unit 1102. The smoothing unit 1102 includes capacitors 1102a and 1102b. The inverter unit 1103 includes a plurality of switch units 1103a to 1103h and receives a 3-level voltage from the smoothing unit 1102. The inverter unit 1103 includes a first switch unit 1103a provided between the first node A and a first output terminal OUT1, second switch units 1103c and 1103d provided between the second node B and the first output terminal OUT1, a third switch unit 1103b provided between the third node C and the first output terminal OUT1, a fourth switch unit 1103e provided between the first node A and the second output terminal OUT2, fifth switch units 1103g and 1103h provided between the second node B and the second output terminal OUT2, and a sixth switch unit 1103f provided between the third node C and the second output terminal OUT2. A switch unit includes a diode and a power semiconductor. The diode and the power semiconductor have mutually opposite current directions. The power semiconductor includes an IGBT or a power MOSFET.

The capacitors 1102a and 1102b provided in the smoothing unit 1102 are connected to the rectifying unit 1101 and a capacitor may additionally be connected to an output terminal of the rectifying unit 1101 in series or in parallel. The inverter unit 1103 is a single phase T-type NPC inverter. The switch units 1103a, 1103b, 1103c, and 1103d constitute one leg and the switch units 1103e, 1103f, 1103g, and 1103h constitute another leg, a voltage corresponding to a potential difference between the two legs is output.

Figure 12:
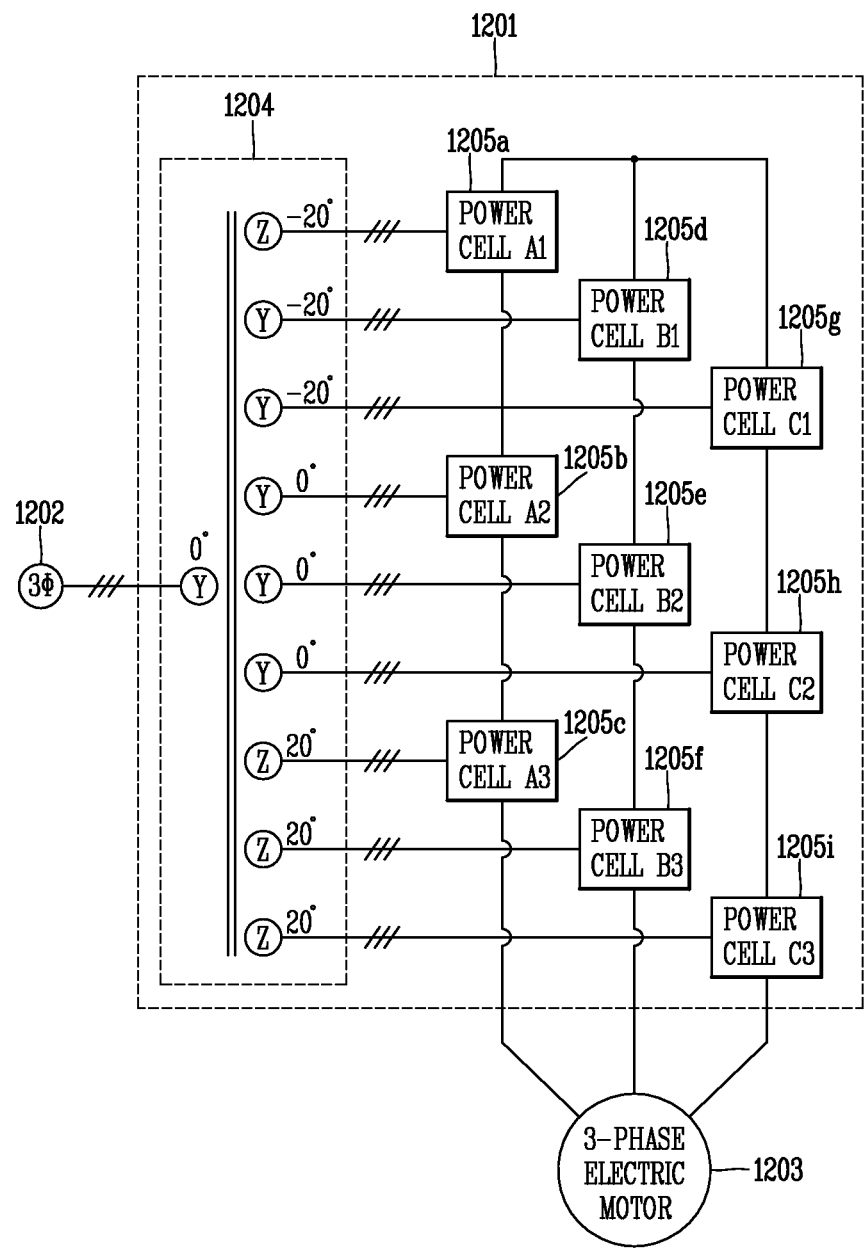
FIGS. 12 through 14 are block diagrams respectively illustrating examples of inverters using a unit power cell of FIG. 11.
Figure 13:
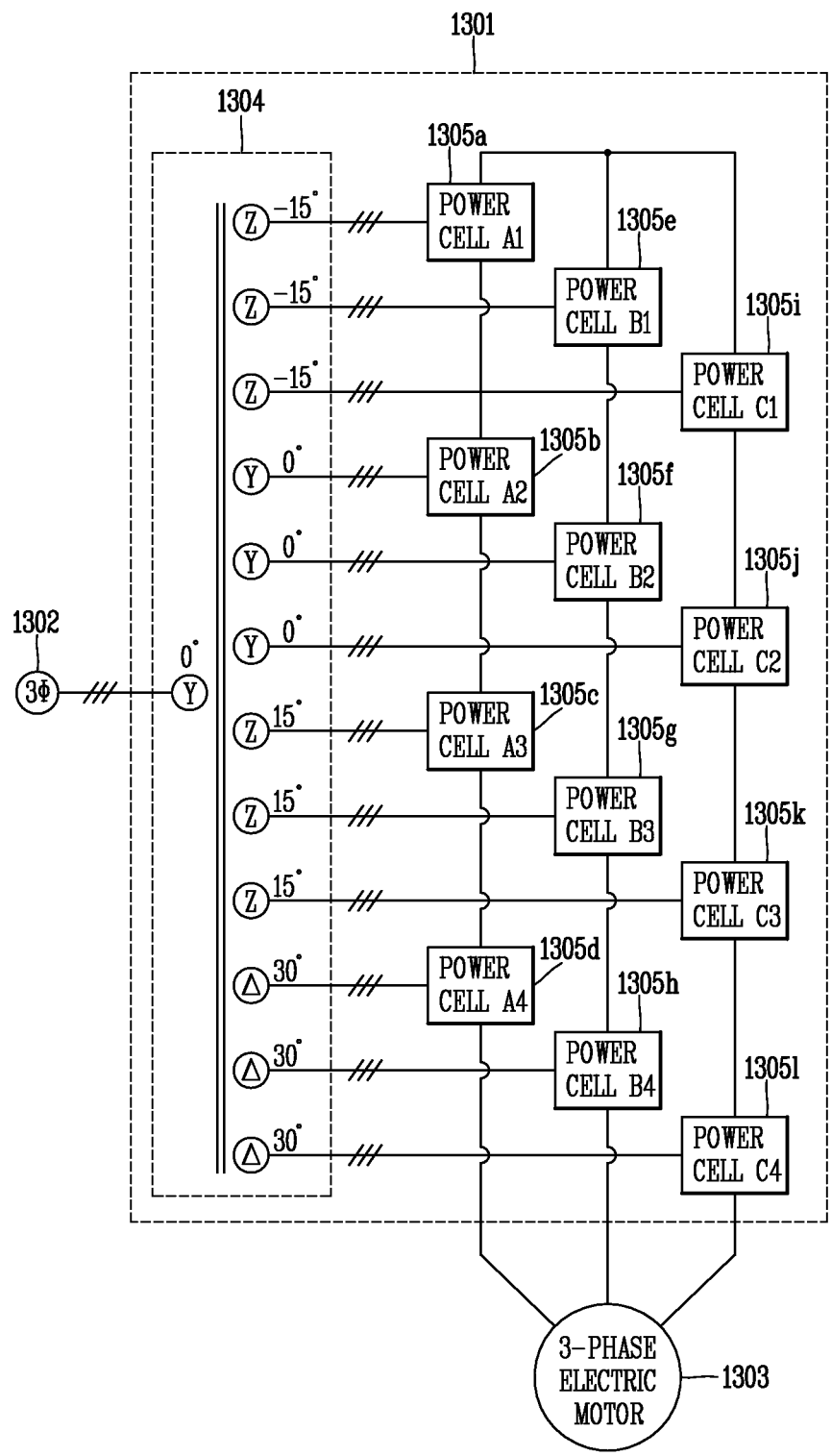
Figure 14:
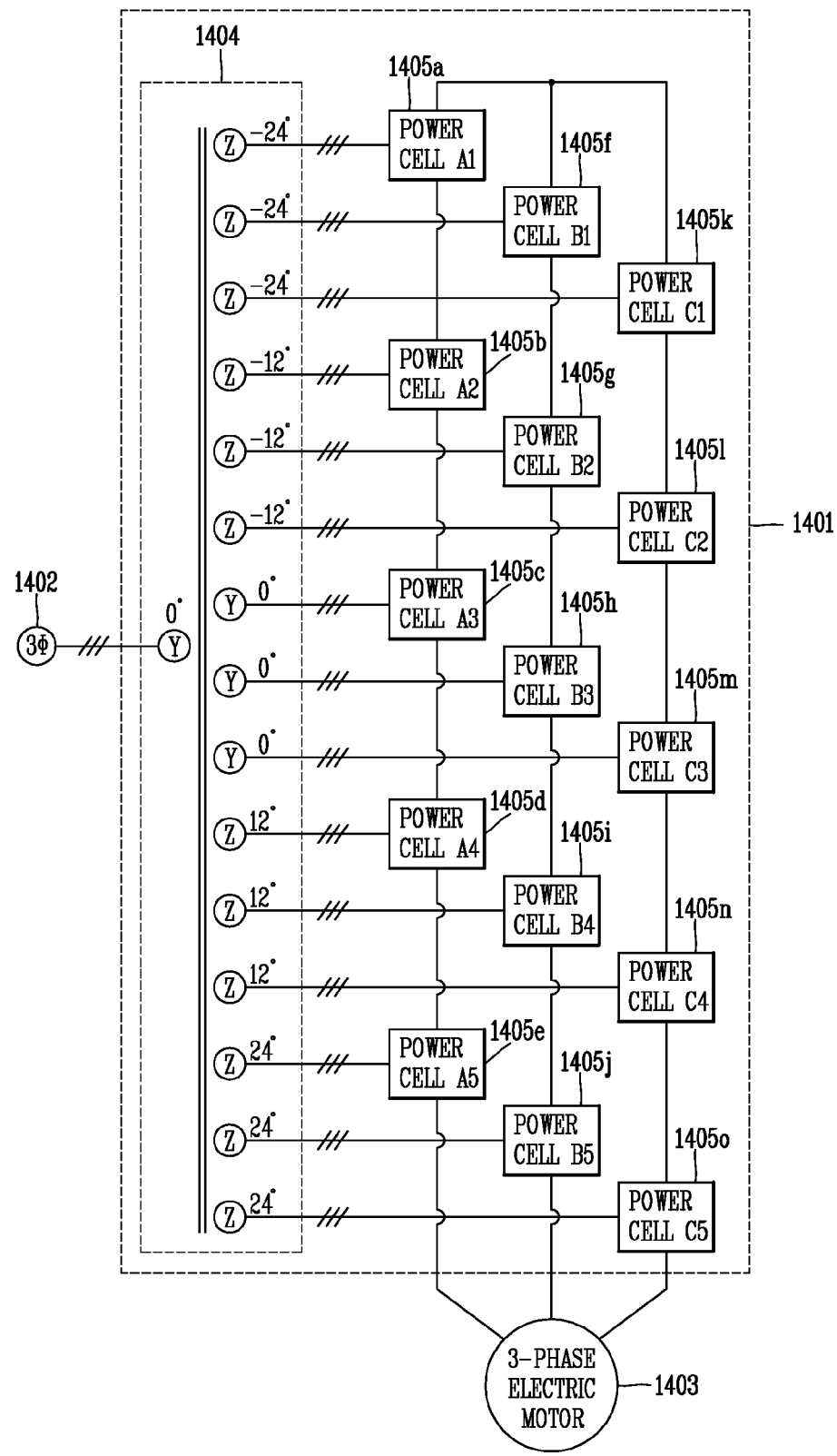

FIGS. 12 through 14 are block diagrams respectively illustrating examples of T-type NPC inverters using unit power cells of FIG. 11.

FIG. 12 is a view illustrating a medium-voltage inverter implemented with a total of nine unit power cells with three unit power cells per phase of a motor, FIG. 13 is a view illustrating a medium-voltage inverter implemented with a total of twelve unit power cells with four unit power cells per phase of a motor, and FIG. 14 is a view illustrating a medium-voltage inverter implemented with a total of fifteen unit power cells with five unit power cells per phase of a motor.

Referring to FIG. 12, a multi-level inverter 1201 according to a first exemplary embodiment of the present disclosure includes nine unit power cells 1205a to 1205i and a phase shift transformer 1204. The voltage supply unit 1202 provides a voltage having a root mean square equal to or greater than 600V. Reference numeral 1203 denotes a three-phase motor as a load. A phase angle of power output by the phase shift transformer 1204 may be varied. The unit power cells 1205a to 1205i may synthesize five levels of (or five types of) output voltage. The unit power cells 1205a, 1205b, and 1205c output an a-phase voltage to the motor 1203, the unit power cells 1205d, 1205e, and 1205f output a b-phase voltage, and unit power cells 1205g, 1205h, and 1205i output a c-phase voltage.

Referring to FIG. 13, a multi-level inverter 1301 according to a second exemplary embodiment of the present disclosure includes twelve unit power cells 1305a to 1305l and a phase shift transformer 1304. A power supply unit 1302 provides a voltage having a root mean square equal to or greater than 600V. Reference numeral 1303 denotes a three-phase motor as a load. A phase angle of power output by the phase shift transformer 1304 may be varied. The unit power cells 1305a to 1305l may synthesize 5 levels of output voltage. The unit power cells 1305a, 1305b, 1305c, and 1305d output an a-phase voltage to the motor 1303, the unit power cells 1305e, 1305f, 1305g, and 1305h output a b-phase voltage, and unit power cells 1305i, 1305j, 1305k, and 1305l output a c-phase voltage.

Referring to FIG. 14, a multi-level inverter 1401 according to a third exemplary embodiment of the present disclosure includes fifteen unit power cells 1405a to 1405o and a phase shift transformer 1404. A power supply unit 1402 provides a voltage having a root mean square equal to or greater than 600V. Reference numeral 1403 denotes a three-phase motor as a load. A phase angle of power output by the phase shift transformer 1404 may be varied. The unit power cells 1405a to 1405o may synthesize 5 levels of output voltage. The unit power cells 1405a, 1405b, 1405c, 1405d, and 1405e output an a-phase voltage to the motor 1403, the unit power cells 1405f, 1405g, 1405h, 1405i, and 1405j output a b-phase voltage, and unit power cells 1405k, 1405l, 1405m, 1405n, and 1405o output a c-phase voltage.

An inverter unit described in the present exemplary embodiment is implemented as a single phase T-type NPC inverter, and as illustrated in FIG. 11, in the inverter unit 1103 provided in a unit power cell, each leg includes four switch units. An output pole voltage is defined according to operations of the switch units 1103a, 1103b, 1103c, and 1103d. The switch units 1103a and 1103c cannot be simultaneously turned on, and the switch units 1103b and 1103d cannot be simultaneously turned on. Also, operations of the switch units 1103a and 1103b are independent. In a case in which a requested output pole voltage reference is positive (+), the switch units 1103a and 1103c operate, and in a case in which a requested output pole voltage reference is negative (−), the switch units 1103b and 1103d operate.

In a case in which voltages of the DC link capacitors 1102a and 1102b connected in series in the smoothing unit 1102 are defined as E, respectively, if an output pole voltage reference is positive (+), the switch unit 1103a is turned on and the switch unit 1103c is turned off to output a pole voltage E, respectively. In this case, when the switch unit 1103a is turned off and the switch unit 1103c is turned on, a pole voltage 0 is output. If an output pole voltage reference is negative (−), the switch unit 1103b is turned on and the switch unit 1103d is turned off to output a pole voltage −E. In this case, when the switch unit 1103b is turned off and the switch unit 1103d is turned on, a pole voltage 0 is output. Based on this output structure, the output line-to-line voltage of each unit cell, namely, an output pole voltage, has five levels of (or types of) 2E, E, 0, −E, −2E. When the output pole voltage is determined as E, 0, −E, a conduction state of the power semiconductor according to a direction of a current is illustrated in FIGS. 15 through 20.

FIGS. 15 through 21 are circuit diagrams illustrating operations of inverter units illustrated in FIG. 11, and FIGS. 22 through 25 are waveform views illustrating operations of the inverter unit illustrated in FIG. 11.

Figure 15:
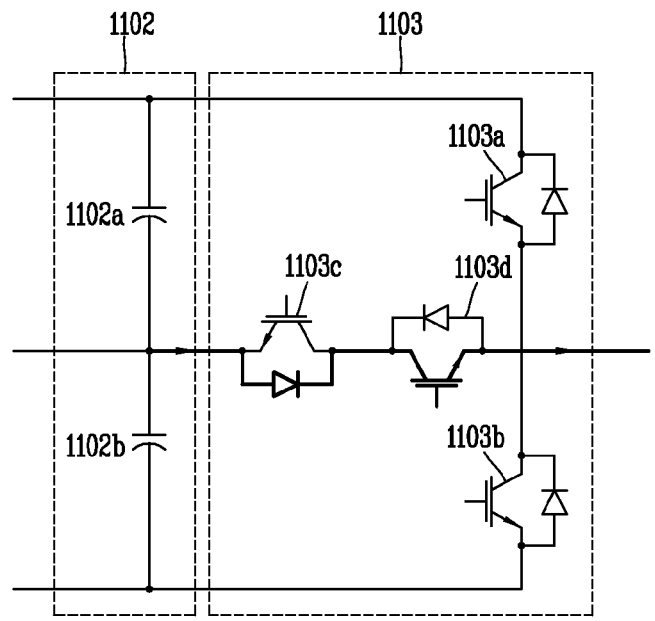
FIGS. 15 through 21 are circuit diagrams illustrating operations of inverter units illustrated in FIG. 11
Figure 16:
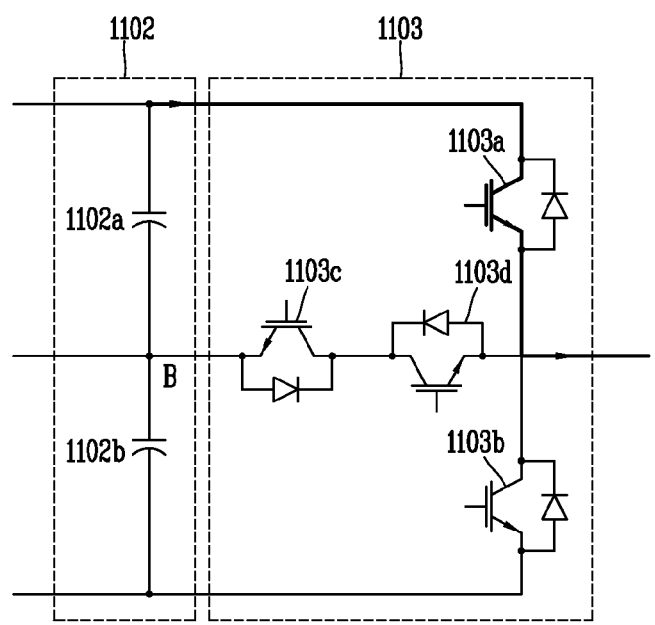
Figure 17:
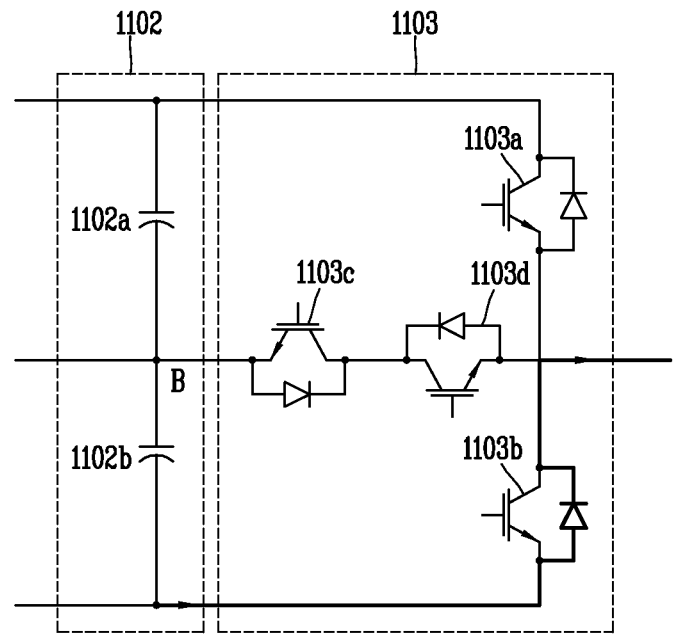
Figure 18:
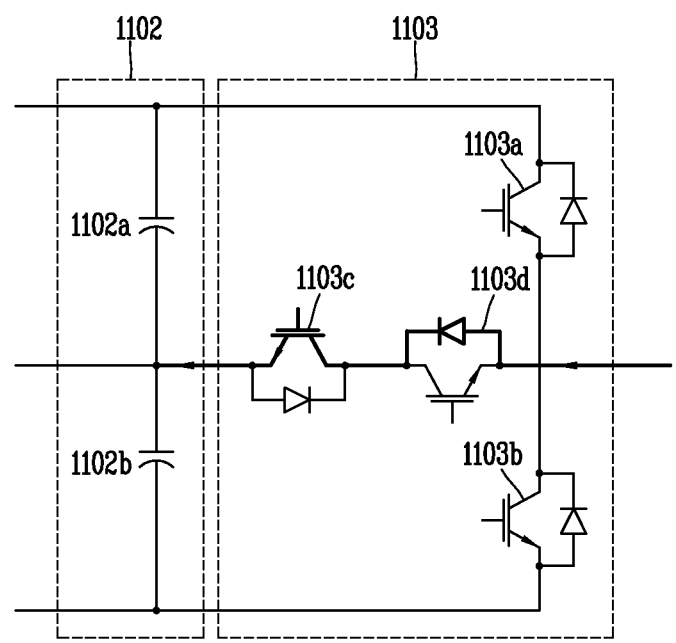
Figure 19:
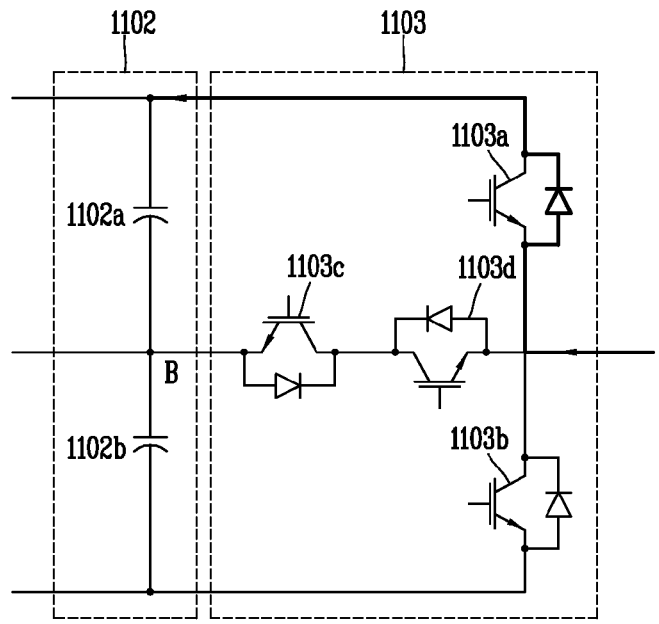
Figure 20:
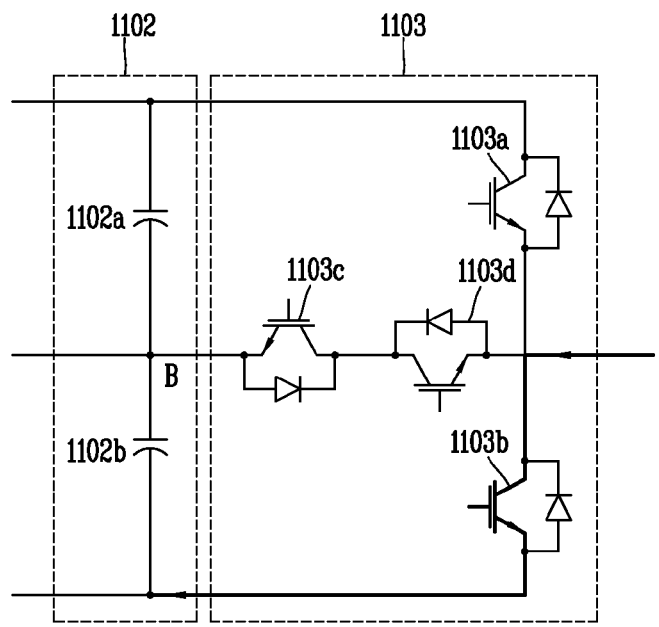

In FIG. 15, a diode and a switch unit 1103d are conducted, an output current flows in a positive direction, and a pole voltage 0 is output. Here one diode and one switch are conduced. In FIG. 16, a switch unit 1103a is conducted, an output current flows in a positive direction, and a pole voltage E is output. Here, one switch unit is conducted. In FIG. 17, a diode is conducted, an output current flows in a positive direction, and a pole voltage −E is output. Here, one diode is conducted. In FIG. 18, a diode and a switch unit 1103c are conducted, an output current flows in a negative direction, and a pole voltage 0 is output. Here, one diode and one switch unit are conducted. In FIG. 19, a diode is conducted, an output current flows in a negative direction, and a pole voltage E is output. Here, one diode is conducted. In FIG. 20, a switch unit 1103b is conducted, an output current flows in a negative direction, and a pole voltage −E is output. Here, one switch unit is conducted.

In the cases of FIGS. 15 and 18, one switch unit and one diode are conducted, while in the other cases, only one diode or only one switch unit is conducted, and thus, the number of conducted power semiconductor elements on average is reduced, compared to the cases of FIGS. 5 through 10, and thus, loss made in the power semiconductor elements is reduced, increasing efficiency of the overall system, and thus, a size of heat dissipation may be reduced.

Hereinafter, a solution to unbalance between two the DC link capacitors that may occur as a diode rectifying unit of a unit power cell is configured as a 6-pulse diode rectifying unit will be described.

In FIG. 11, an average output voltage of the rectifying unit 1101 is defined as follows.

$$(V_{dc\_cap}) = \frac{3\sqrt{6}\,V}{\pi} \qquad \text{[Equation 2]}$$

Here, V is a magnitude of a phase voltage of input power of a diode rectifying unit. When voltages of the capacitors 1102a and 1102b of the smoothing unit of FIG. 11 are defined as Vdc_1 and Vdc_2, the following relation is established.

$$(V_{dc\_cap}) = Vdc\_1 + Vdc\_2 \qquad \text{[Equation 3]}$$

As can be seen from Equation 3, the sum of voltages applied to the capacitors 1102a and 1102b may be constant all the time, while the values of Vdc_1 and Vdc_2 may differ.

Referring to voltage synthesizing according to current directions illustrated in FIGS. 15 through 20, a pole voltage is output using voltages applied to the capacitors of the smoothing unit. Here, a path of a load current may pass through an internal node between the capacitors 1102a and 1102b, and in this case, voltages across the DC link capacitors may change.

Voltages across the respective capacitors 1102a and 1102b of the smoothing unit may affected by a magnitude and direction of a load current, a switching state, and capacity of the DC link capacitors. When the change in voltages across the DC link capacitors is accumulated, and thus, voltages of the DC link capacitors are not equal to result in unbalance, an output pole voltage may be distorted. If magnitudes of voltages of the capacitors 1102a and 1102b of the smoothing unit are different, one of voltages Vdc_1 and Vdc_2 converges on 0 and the other converges on Vdc_cap according to an output situation of the inverter unit defined in FIGS. 15 through 20. When a voltage of one DC link capacitor is increased to exceed a withstand voltage of the DC link capacitor, the corresponding DC link capacitor or a switch configured as a power semiconductor has an error and the inverter unit has a fault, requiring a solution thereto.

In the present exemplary embodiment, the voltages of the DC link capacitors are balanced through the following process.

Figure 21:
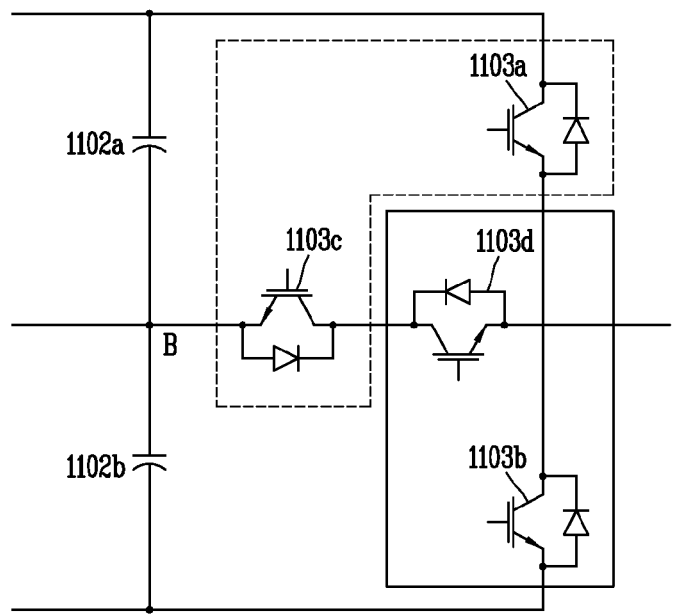
Figure 22:
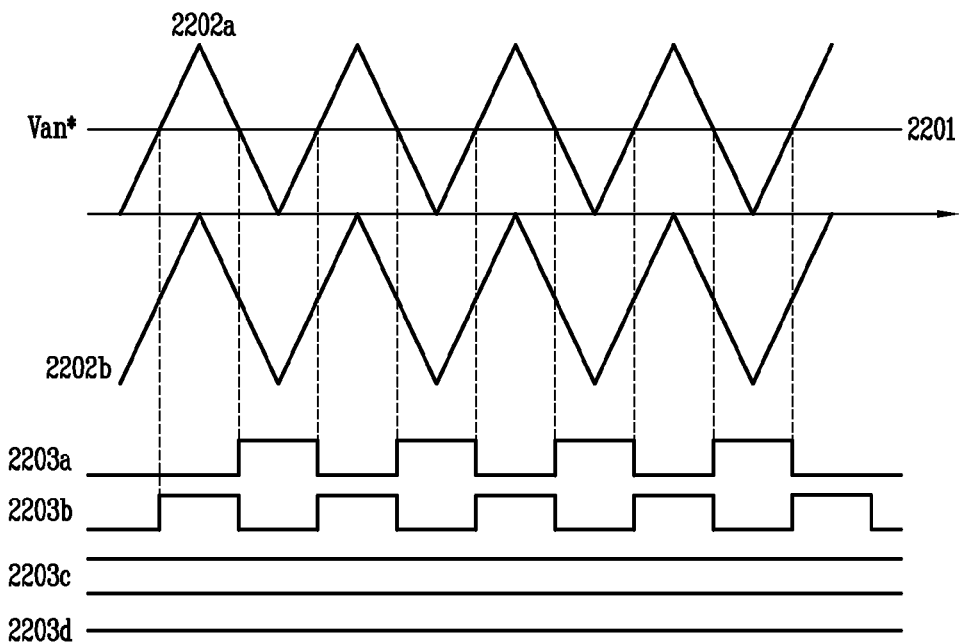
FIGS. 22 through 25 are waveform views illustrating operations of the inverter unit illustrated in FIG. 11.
Figure 23:
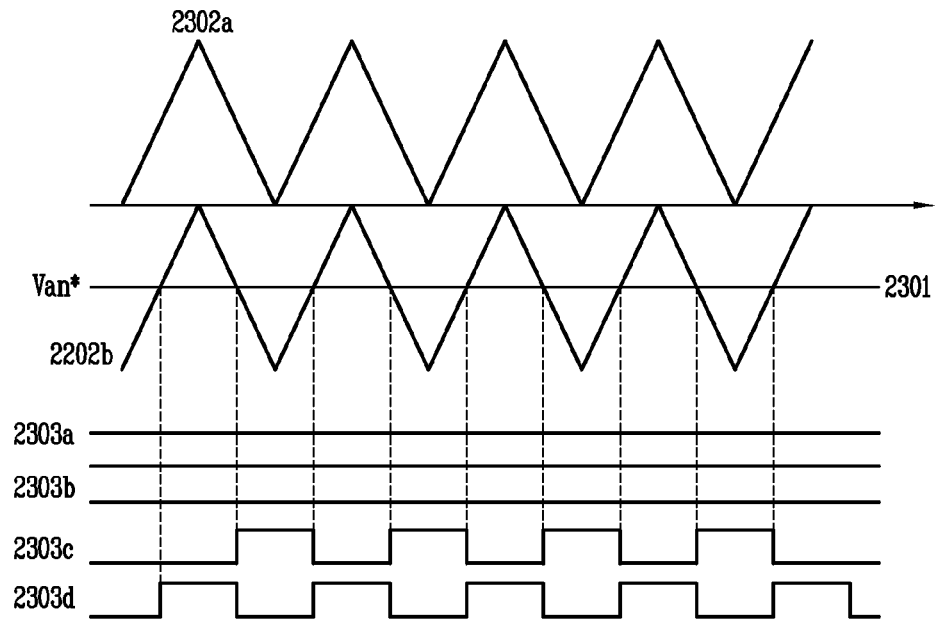

FIG. 21 illustrates one leg of the inverter unit of FIG. 11. In FIG. 21, the dotted line and the solid line form the carriers as illustrated in FIGS. 22 and 23. In FIGS. 22 and 23, reference numerals 2201 and 2301 denote reference pole voltages of FIG. 21. 2202a and 2302a denote carries of the switch units 1103a and 1103b of FIG. 21, which are triangular waves having a maximum value Vdc_1 and a minimum value 0 when Vdc_1 and Vdc_2 have the same value. 2202b and 2302b are carriers of the switch units 1103c and 1103d of FIG. 21 having a maximum value 0 and a minimum value −Vdc_2, when Vdc_1 and Vdc_2 have the same value. 2203a and 2303a denote switching states of the switch unit 1103a. 2203b and 2303b denote a switching state of the switch unit 1103b. 2203c and 2303c denote a switching state of the switch unit 1103c. 2203d and 2303d denote a switching state of the switch unit 1103d.

FIG. 22 illustrates a case in which a pole voltage reference is positive (+), and FIG. 23 illustrates a case in which a pole voltage reference is negative (−). In the case in which the pole voltage reference is positive as illustrated in FIG. 22, the switch units 1103a and 1103b are turned on or turned off, the switch unit 1103c is constantly turned on, and the switch unit 2103d is constantly turned off, according to the triangular carrier compared based on the pole voltage reference. In the case in which the pole voltage reference is negative as illustrated in FIG. 23, the switch units 1103c and 1103d are turned on or turned off, the switch 1103a is constantly turned off, and the switch unit 1103b is constantly turned on, according to the triangular carrier compared based on the pole voltage reference. When values of Vdc_1 and Vdc_2 are different, the triangular carriers of FIGS. 22 and 23 are varied as illustrated in FIGS. 24 and 25.

Figure 24:
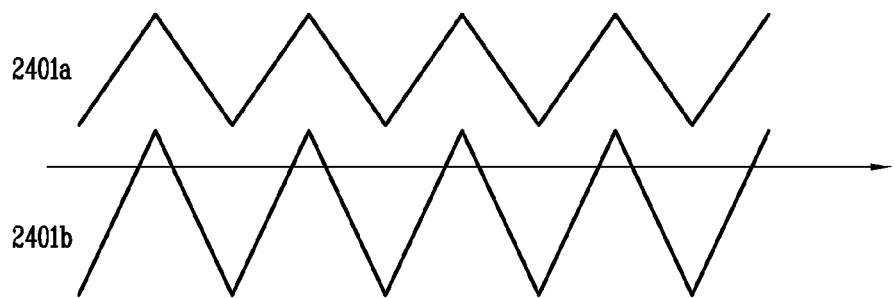
Figure 25:
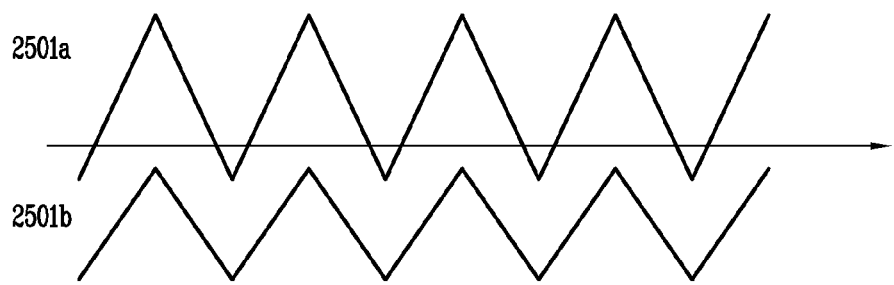

In FIG. 24, Vdc_2 is greater than Vdc_2, and in FIG. 25, Vdc_1 is greater than Vdc_2. In FIGS. 24 and 25, 2401a and 2501a are triangular carriers of the switch units 1102a and 1102b having a maximum value (Vdc_1+Vcd_2)/2 and a minimum value (−Vdc_1+Vcd_2)/2. 2401b and 2501b are triangular carriers of the switch units 1102c and 1102d having a maximum value (−Vdc_1+Vcd_2)/2 and a minimum value (−Vdc_1−Vcd_2)/2. In the case of FIG. 24, when the pole voltage reference is positive, a time duration in which the states of FIGS. 16 and 19 are maintained is shortened, and when the pole voltage reference is negative, a time duration in which the states of FIGS. 17 and 20 are maintained is increased. In the case of FIG. 25, when the pole voltage reference is positive, a time duration in which the states of FIGS. 16 and 19 are maintained is increased, and when the pole voltage reference is negative, a time duration in which the states of FIGS. 17 and 20 are maintained is reduced. As a result, utilization of the capacitor having a small DC link voltage applied in the smoothing unit is reduced and the use of the capacitor having a large DC link voltage is increased, thus resolving an unbalance of the DC link power voltages.

As described above, the present disclosure provides a multi-level medium-voltage inverter in which a single phase 3-level inverter unit 1103 is included in a unit power cell, and in particular, an input unit of the unit power cell is configured as a 6-pulse diode rectifying unit and the inverter unit of the unit power cell reduces conduction loss, relative to the existing 3-level NPC inverter, increasing efficiency of the unit power cell.

In the existing medium-voltage inverter, an inverter unit of a unit power cell is configured as an H-bridge inverter or a single phase NPC inverter and unit power cells are connected in series. In contrast, the unit power cell of the multi-level medium-voltage inverter proposed in the present disclosure includes a single phase T-type NPC inverter. The unit power cell including the single phase T-type NPC inverter proposed in the present disclosure has conduction loss smaller than that of the existing unit power cell, and thus, a design for heat dissipation is advantageous and the number of power semiconductor elements used in operating the unit power cell is smaller than that of the unit power cell using a single phase NPC inverter. Thus, compared to the existing multi-level medium-voltage inverter, the multi-level inverter has increased efficiency and costs and volume thereof may be reduced.

Also, the input terminal of the unit power cell using the T-type NPC inverter used in the present disclosure may be configured as a 6-pulse, 12-pulse, or 24-pulse diode rectifying unit. In the case of using the 6-pulse diode rectifying unit, the structure of a phase shift transformer of the input terminal may be simplified, compared to the case of using the 12-pulse or 24-pulse diode rectifying unit. Also, in a case in which the input terminal of the unit power cell is configured as a 6-pulse diode rectifying unit by reducing the number of secondary side output terminals of the phase shift transformer, voltages of the DC link capacitors of the smoothing unit may be balanced by changing a magnitude of a carrier.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A multi-level inverter comprising:
a rectifying unit configured to receive a phase voltage from a 3-phase power source and provide a rectified voltage;
a smoothing unit configured to receive the rectified voltage and provide the received rectified voltage as voltages having different levels to first to third nodes; and
an inverter unit including a plurality of switch units to transmit the voltages having three levels provided from the smoothing unit to a load,
wherein the inverter unit includes a first switch unit provided between the first node and a first output terminal, second switch units provided between the second node and the first output terminal, a third switch unit provided between the third node and the first output terminal, a fourth switch unit provided between the first node and a second output terminal, a fifth switch unit provided between the second node and the second output terminal, and a sixth switch unit provided between the third node and the second output terminal;
wherein the first switch unit comprises:
a first diode having directivity of a current from the first output terminal to the first node; and
a first power semiconductor having a current flow in the opposite direction of the first diode and connecting one side and the other side of the first diode,
wherein the third switch unit comprises:
a second diode having directivity of a current from the third node to the first output terminal; and
a second power semiconductor having a current flow in the opposite direction of the second diode and connecting one side and the other side of the second diode,
wherein the fifth switch unit comprises:
a first diode having directivity of a current from the second node to the second output terminal;
a first power semiconductor having a current flow in the opposite direction of the first diode and connecting one side and the other side of the first diode;
a second diode having a current flow in the opposite direction of the first diode and connected to the first diode in series; and a second power semiconductor having a current flow in the opposite direction of the first power semiconductor and connecting one side and the other side of the second diode, and
wherein the cathode of the first diode and the cathode of the second diode in the fifth switch unit are directly connected to each other.

2. The multi-level inverter of claim 1, wherein the first to sixth switch units include a power semiconductor and a diode.

3. The multi-level inverter of claim 1, wherein the second switch units comprises:
a first diode having directivity of a current from the second node to the first output terminal;
a first power semiconductor having a current flow in the opposite direction of the first diode and connecting one side and the other side of the first diode;
a second diode having a current flow in the opposite direction of the first diode and connected to the first diode in series; and
a second power semiconductor having a current flow in the opposite direction of the first power semiconductor and connecting one side and the other side of the second diode.

4. The multi-level inverter of claim 1, wherein the fourth switch unit comprises:
a first diode having directivity of a current from the second output terminal to the first node; and
a first power semiconductor having a current flow in the opposite direction of the first diode and connecting one side and the other side of the first diode.

5. The multi-level inverter of claim 4, wherein the sixth switch unit comprises:
a second diode having directivity of a current from the third node to the second output terminal; and
a second power semiconductor having a current flow in the opposite direction of the second diode and connecting one side and the other side of the second diode.

6. The multi-level inverter of claim 1, wherein the smoothing unit comprises:
first and second capacitors connected in series, wherein the first and second capacitors receive the rectified voltage through one side and the other side thereof, and one side, a common node, and the other side of the first and second capacitors are the first to third nodes.

7. The multi-level inverter of claim 6, wherein the rectifying unit comprises:
first and second diodes connecting one side and the other side of each of the first and second capacitors and receiving a first phase voltage by the common node;
third and fourth diodes connecting one side and the other side of each of the first and second capacitors and receiving a second phase voltage by the common node; and
fifth and sixth diodes connecting one side and the other side of each of the first and second capacitors and receiving a third phase voltage by the common node.

8. The multi-level inverter of claim 1, further comprising: a plurality of unit power cells each including the rectifying unit, the smoothing unit, and the inverter unit, and further comprising a phase shift transformer receiving a phase voltage and providing a power signal having a predetermined phase to the unit power cells.

* * * * *